Figure 4:
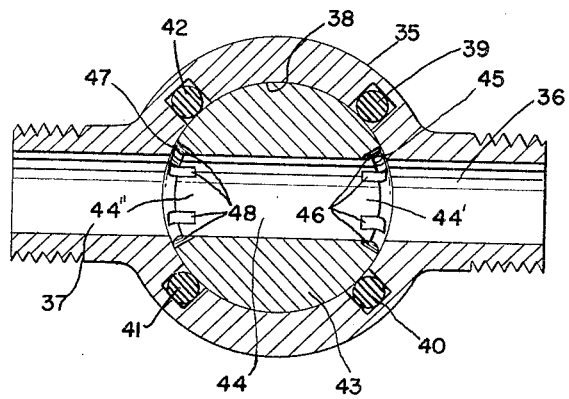

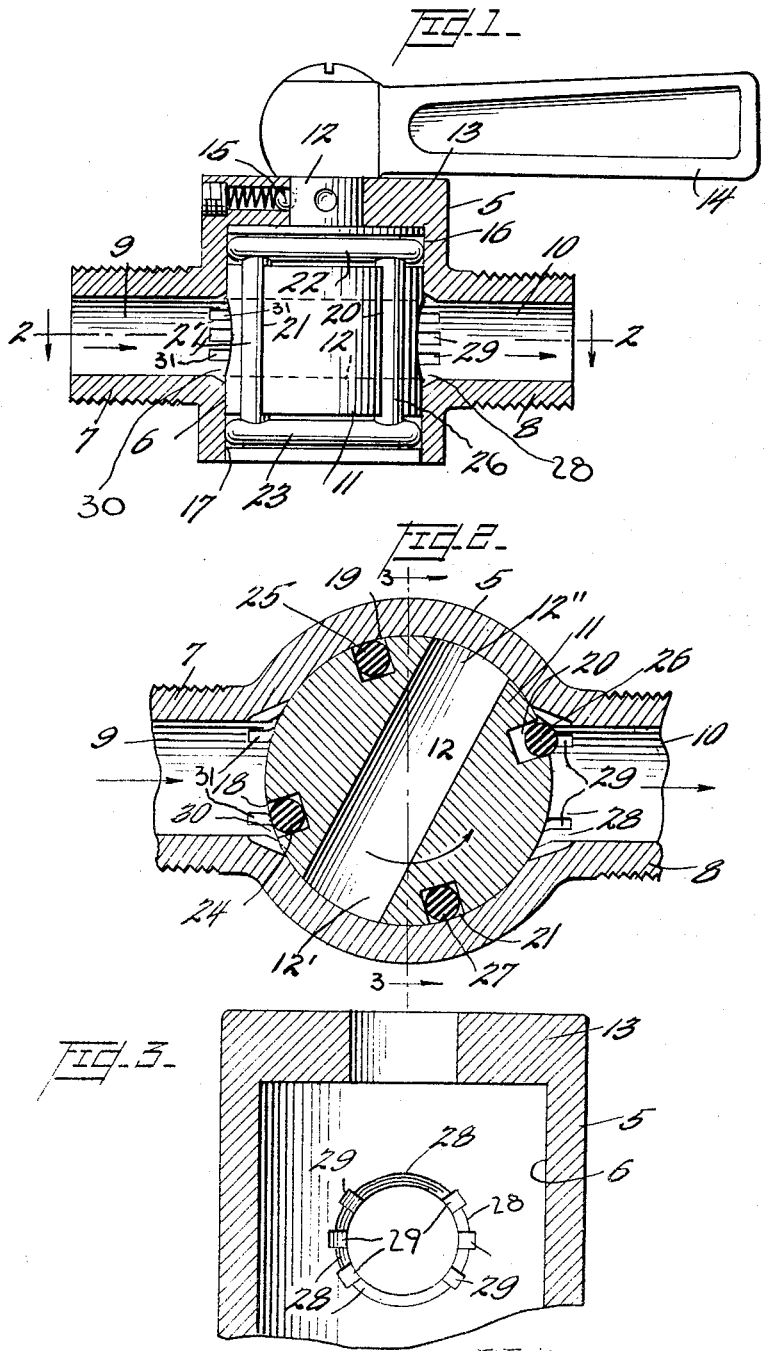

April 3, 1951 W. E. GOULD 2,547,116
VALVE

Filed Jan. 22, 1946 2 Sheets-Sheet 2

INVENTOR.
WALLACE E. GOULD
BY
ATTORNEYS

Patented Apr. 3, 1951

2,547,116

UNITED STATES PATENT OFFICE 2,547,116

VALVE

Wallace E. Gould, Decatur, Ill., assignor to Mueller Co., Decatur, Ill., a corporation of Illinois Application January 22, 1946, Serial No. 642,608

10 Claims. (Cl. 251—103)

In valves of the rotary plug type wherein the plug is equipped with O-rings, or equivalent continuous sealing elements, the leading side of the sealing element crossing the housing outlet port is nipped and injured as it engages the far edge of the port. This is due to pressure escaping around the plug, in a path which includes the plug passage, and jetting past the said leading side as it approaches the said far edge and building up under the said side after it contacts the said edge, thus causing a protrusion of the said leading side. When the sealing elements are set in the valve seat, instead of the plug, the difficulty occurs as the trailing edge at the inlet end of the plug passage approaches the far side of the sealing element at the housing inlet. The object of the present invention is to provide means whereby the protruding or unseated portion of the sealing element is forced back into its groove and pressure is relieved past said portion and so is prevented from building up thereunder with the result that injury to the sealing elements is avoided.

Figure 5:
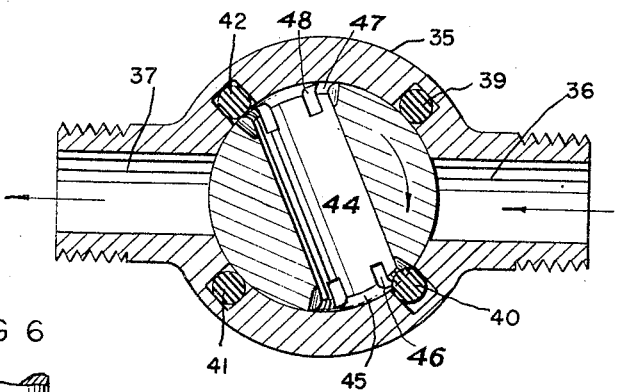
Figure 6:
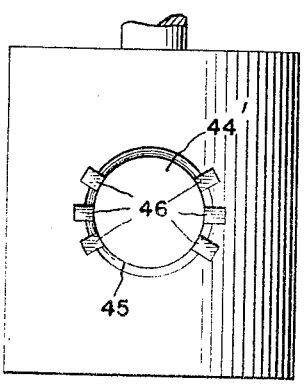
Figure 7:
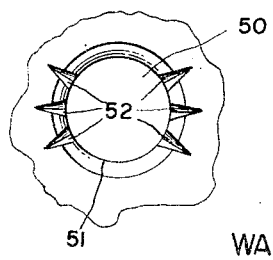

Valves in accordance with the invention are shown in the accompanying drawings. The plug, or seat, may be equipped with a sealing harness of the type disclosed in the copending application of Lucien W. Mueller, Serial No. 591,915, filed May 4, 1945, but it will be understood that separate O-rings of usual type are just as applicable under the invention. In the drawings:

Figure 1 is a section of a rotary plug valve taken in a plane which includes the common axis of opposed housing ports and the plug axis, the plug carrying the sealing means, Figure 2 is a section somewhat enlarged, on line 2—2 of Figure 1, Figure 3 is a section on line 3—3 of Figure 2 with the plug removed, Figure 4 is a section like that of Figure 2 of an embodiment wherein the sealing means is disposed in the valve seat, Figure 5 shows the parts of Figure 4 in a different relation, Figure 6 is an elevation of the plug of Figures 4 and 5, and Figure 7 shows a modification in elevation.

Referring to Figures 1 to 3, the valve comprises a housing 5 defining a seat 6 of circular section, here shown as cylindrical. The casing includes diametrically opposed necks 7 and 8 defining ports 9 and 10 intersecting the seat. Either port may be the inlet and the other the outlet.

Reference numeral 11 designates a rotary plug mating with the seat 6 and provided with a diametrical flow passage 12 with ports 12' and 12" of which either may be the inlet and the other the outlet. In the on position of Figure 1 passage 12 directly connects the housing ports. The plug has a stem 12a passing through an opening in the top wall 13 of the casing and equipped with a handle 14. A spring-pressed detent 15 cooperating with indentations in the stem 12a to yieldingly establish on and off positions. The plug is provided with top and bottom annular recesses 16 and 17 which are connected by parallel axially extending recesses 18 and 19 on one side of the plug passage and 20 and 21 on the other side. A rubber harness includes top and bottom ring portions 22 and 23 in grooves 16 and 17 and connecting portions 24, 25, 26 and 27 in the grooves 18 to 21. This arrangement is disclosed in the above-mentioned application. The harness is freely received in the grooves and functions in the manner of the usual O-rings and constitutes continuous rubber sealing elements which are distortable by fluid pressure into sealing engagement between the plug 11 and the seat 6 when the plug is turned to its offset position. When the valve is in closed position the plug passage 12 is perpendicular to the line of the ports and harness portions 24 and 25 and the connecting portions of rings 22 and 23 surround the inlet port while harness portions 25, 17 and connecting ring portions, surround the outlet port so that a seal is established completely around both ports between the plug and the seat.

In accordance with the present invention, the housing ports have annular chamfered margins 28 and 30 adjacent the seat 6 and are provided laterally with parallel-walled grooves 29 and 31 which extend in the direction of flow with their bottom walls inclined outwardly toward the axis of the ports, the grooves terminating outwardly beyond the chamfer. In Figure 2, the plug is turned toward off position in the direction of the arrow and port 10 is assumed to be the outlet port. The leading side 26 of the seal for the outlet port is shown as forced somewhat out of its groove due to inlet pressure entering between the plug and the seat and reaching the outlet port via the passage 12 and between the plug and the seat just in advance of the leading side 26 of the port seal. As turning of the plug continues, the lands between the grooves 29 act to force portion 26 with a camming action back into the groove 20. Pressure is simultaneously being relieved through the grooves and, consequently, will not build up behind portion 26. Due to the dual effects of slowly diminishing pressure relief and the in-pressing action of the chamfered lands, closing of the valve is accomplished with no injury to the sealing means. When the off position is reached, seal members 26 and 27 are opposite solid wall portions of the seat so that a seal is established entirely around the outlet port.

It is contemplated that the illustrated valve plug is turnable between on and off positions in either direction and that, consequently, either of portions 26 and 27 may be the leading portion crossing the seat. Since both of the housing ports are provided with the grooves and chamfered lands it will be evident that the valve can be set in the line in either direction. If stops are provided so that the plug has to be turned back and forth between on and off positions, it will be evident that the same portion 26 or 27 will always be the leading portion and, consequently, as a matter of necessity, the chamfer and grooves would have to be provided at only the one appropriate side of the port.

Referring to Figures 4 to 6 the housing 35 has opposed ports 36 and 37 and a seat 38 of circular section. In this case the seat is provided with grooves surrounding the ports and receiving endless sealing means in the nature of O-rings, side portions of the sealing means being designated at 39, 40, 41, and 42. The mating plug 43 has a diametrical passage 44 with ports 44' and 44''. The plug ports are chamfered at 45 and 47 and are provided laterally with grooves 46 and 48 which incline outwardly toward the seat.

When the plug is turned from the on position of Figure 4 toward off position in the direction of the arrow, Figure 5, the side 40 of the sealing means is the side which ordinarily would be apt to be damaged, and in Figure 5 the side 40 is shown as somewhat protruded from the groove. The protruding effect is minimized by the slowly diminishing pressure relief afforded by the grooves and, at the same time, the chamfered lands act to tuck the protruded portion back into the groove. Since both sides of both plug ports are chamfered and grooved, no check is required for the plug and the valve can be connected in the line for the control of flow in either direction.

In Figure 7 reference numeral 50 designates a plug or housing port with a chamfered margin 51 and with grooves 52 which are V-shaped in plan and section and taper away from the edge of the port to a point beyond the chamber. This form of groove diminishes escape gradually to zero.

Variations in the form and arrangement of parts from those herein specifically described are contemplated under the following claims.

I claim:

1. A valve comprising a housing defining a valve seat of circular cross section and inlet and outlet ports intersecting said seat, a plug mating with said seat and having a flow passage therethrough, said plug being turnable between on and off positions and having continuous grooves at the sides of said passage which in the off position surround said ports respectively, continuous rubber sealing elements in said grooves, said outlet port having a chamfered lateral margin at the seat grooved in the direction of flow and extending outwardly beyond the chamfered margin so that when the plug is turned toward off position said margin acts to press back into its groove the leading side, if displaced, of the sealing element crossing the outlet port and simultaneously to relieve pressure past said leading side.

2. A valve comprising a housing defining a valve seat of circular cross section and inlet and outlet ports intersecting said seat, a plug mating with said seat and having a flow passage therethrough, said plug being turnable between on and off positions and having continuous grooves at the sides of said passage which in the off position surround said ports respectively, continuous rubber sealing elements in said grooves, said outlet port having chamfered side marginal portions at the seat grooved in the direction of flow and extending outwardly beyond the chamfered margin so that when the plug is turned in either direction toward off position one of said marginal portions acts to press back into its groove the leading side, if displaced, of the sealing element crossing the outlet port, and simultaneously to relieve pressure past said leading side.

3. A valve comprising a housing defining a valve seat of circular cross section and inlet and outlet ports intersecting said seat, a plug mating with said seat and having a flow passage therethrough, said plug being turnable between on and off positions and having continuous grooves at the sides of said passage which in the off position surround said ports respectively, continuous rubber sealing elements in said grooves, said ports each having chamfered lateral marginal portions at the seat provided with grooves extending in the direction of flow and extending outwardly beyond the chamfered margin so that when the plug is turned in either direction toward off position one of said marginal portions acts to press back into its groove the leading side, if displaced, of the sealing element crossing the outlet port and simultaneously to relieve pressure past said leading side.

4. A valve comprising a housing member having inlet and outlet ports and a seat of circular cross section intersected by said ports, a rotary plug member in said seat having a passage including inlet and outlet ports registrable with the housing member ports, means for turning said plug between on and off positions, said seat and said plug member having opposed surfaces, one of said surfaces having a continuous groove which in the off position of the plug surrounds a port of one of said members and is opposed to the surface of the other of said members, an endless rubber sealing element in said groove and coacting with the surface of said other member to provide a seal between the seat and plug member, one of the ports of said other member having a chamfered lateral margin grooved in the direction of flow and extending outwardly beyond the chamfered margin so that when said plug member is turned toward off position said margin acts to press back into the groove a side of said sealing element affected by unseating fluid pressure and simultaneously to relieve pressure past said side of said sealing element.

5. A valve according to claim 4 wherein the annular groove is in the surface of the plug member and in the off position of the plug member surrounds the outlet port of said housing member, the last-mentioned port having said chamfered and grooved lateral margin.

6. A valve according to claim 4 wherein the annular groove is in the seat surface and surrounds the housing member inlet port, the plug member inlet port having said chamfered and grooved lateral margin.

7. A valve comprising a housing defining a valve seat of circular cross section and inlet and outlet ports intersecting said seat, a plug mating with said seat and having a flow passage therethrough, said plug being turnable between on and off positions, annular grooves in said seat surrounding said ports respectively, continuous rubber sealing elements in said grooves, the inlet end of said passage having a chamfered lateral margin grooved in the direction of flow and extending outwardly beyond the chamfered margin so that when said plug is turned to off position said margin acts to press back into its groove, if displaced, the portion of the sealing element at the far side of said inlet port and simultaneously to relieve pressure past said portion.

8. A valve comprising a housing defining a valve seat of circular cross section and inlet and outlet ports intersecting said seat, a plug mating with said seat and having a flow passage therethrough, said plug being turnable between on and off positions, continuous grooves in said seat surrounding said ports respectively, continuous rubber sealing elements in said grooves, the inlet end of said passage having chamfered side marginal portions grooved in the direction of flow and extending outwardly beyond the chamfered margin so that when the plug is turned in either direction toward off position one of said marginal portions acts to press back into its groove, if displaced, the portion of the sealing element at the far side of said inlet port and simultaneously to relieve pressure past said portion.

9. A valve comprising a housing defining a valve seat of circular cross section and inlet and outlet ports intersecting said seat, a plug mating with said seat and having a flow passage therethrough, said plug being turnable between on and off positions, continuous grooves in said seat surrounding said ports respectively, continuous rubber sealing elements in said grooves, each end of said passage having chamfered side marginal portions grooved in the direction of flow and extending outwardly beyond the chamfered margin so that when the plug is turned in either direction toward off position one of said marginal portions acts to press back into its groove, if displaced, the portion of the sealing element at the far side of the inlet port and simultaneously to relieve pressure past said portion.

10. A valve comprising a housing member having inlet and outlet ports and a seat of circular cross section intersected by said ports, a rotary plug member in said seat having a passage including inlet and outlet ports registrable with the housing member ports, means for turning said plug between on and off positions, said seat and plug member having opposed surfaces, the surface of one of said members having continuous groove which in the off position of the plug surrounds a port of one of said members and is opposed to the surface of the other of said members, an endless rubber sealing element in said groove and coacting with the surface of said other member to provide a seal between the seat and plug member, one of the ports of said other member having a chamfered lateral margin provided with a groove which extends across the chamfer and tapers away from the edge of the chamfered port so that when said plug member is turned toward off position said margin acts to press back into the groove a side of said sealing element affected by unseating fluid pressure and simultaneously to relieve pressure past said side of said sealing element.

WALLACE E. GOULD.

REFERENCES CITED

The following references are of record in the file of this patent:

UNITED STATES PATENTS

| Number | Name | Date |
| --- | --- | --- |
| 2,229,932 | Parker | Jan. 28, 1941 |
| 2,383,983 | Melichar | Sept. 4, 1945 |
| 2,392,319 | Harwood | Jan. 8, 1946 |
| 2,419,481 | Carbon | Apr. 22, 1947 |